(No Model.)

L. A. WHITE.
KETTLE.

No. 248,682. Patented Oct. 25, 1881.

WITNESSES:
Joseph A Miller Jr
Wm L Coop

INVENTOR:
Leonard A White
by Joseph A Miller
atty

UNITED STATES PATENT OFFICE.

LEONARD A. WHITE, OF ATTLEBOROUGH, MASSACHUSETTS.

KETTLE.

SPECIFICATION forming part of Letters Patent No. 248,682, dated October 25, 1881.

Application filed May 21, 1881. (No model.)

*To all whom it may concern:*

Be it known that I, LEONARD A. WHITE, of Attleborough, in the county of Bristol and State of Massachusetts, have invented a new and useful Improvement in Kettles; and I hereby declare that the following is a full, clear, and exact description of the same, reference being had to the accompanying drawings, forming part of this specification.

This invention has reference to kettles or other vessels provided with a bail or handle; and it consists in the peculiar arrangement, with the lid, of a device for holding the bail in the raised position, as will be more fully set forth hereinafter.

Figure 1:
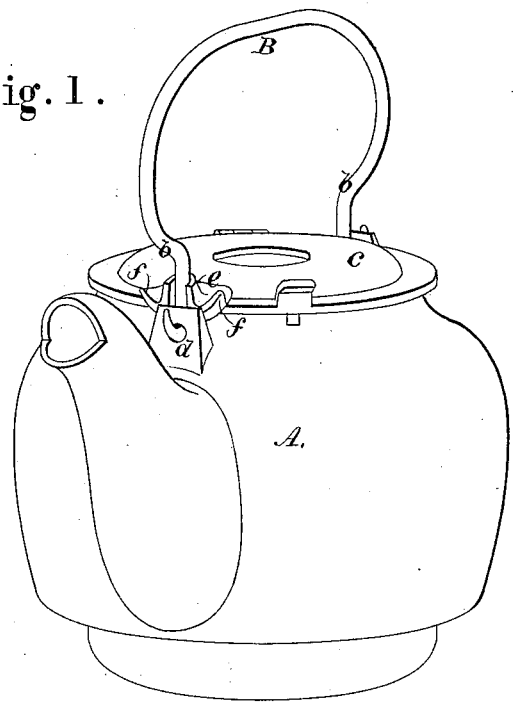
Figure 2:
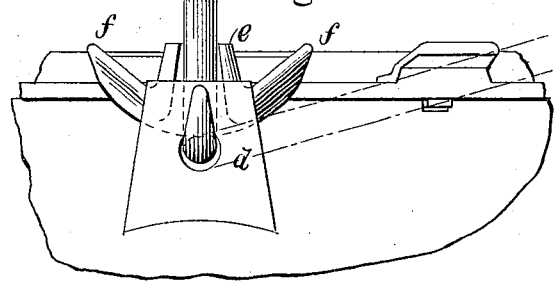
Figure 3:
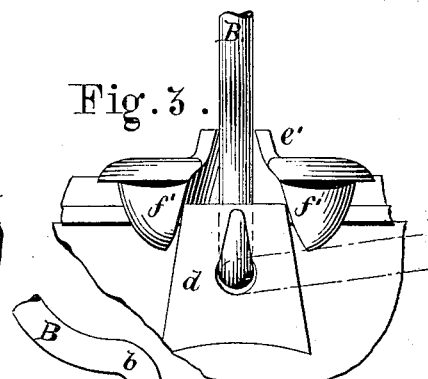
Figure 4:
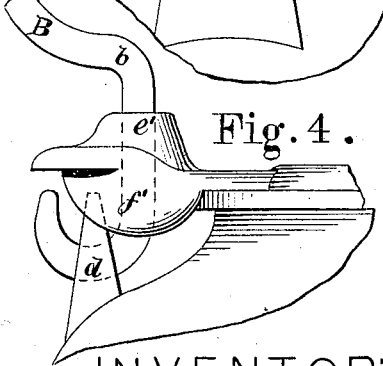

Figure 1 is a perspective view of a kettle provided with a bail or handle held in the raised position by a peculiar-shaped latch attached to the lid. Fig. 2 is an enlarged view, showing the bail in the latch in solid lines, and resting on the sides of the kettle in broken lines. Fig. 3 represents a modification of the latch, constructed to form the lifter of the cover and a rest to prevent lateral motion of the cover. Fig. 4 is a side view of the device shown in Fig. 3.

In the drawings, A represents a kettle, provided with the bail or handle B and the hinged cover C. The bail is hinged in the lugs $d$, and at some distance from the hinge is bent outward, as is usual with such bails.

$e$, Fig. 1, is a latch or fork attached to the lid, and surrounding the lower end of the bail and holding the same so as to retain the vertical position. This latch $e$ is provided with two wings, $f\!f$, one on each side of the latch. When, now, the bail is raised from a recumbent position, it will come in contact with these wings and raise the cover sufficiently to allow the bent portion $b$ to pass under the wings and enter the latch $e$, when the cover will again descend and hold the bail in the vertical position.

The latch may be made to form the guide for the cover by projecting the wings $f'\!f'$ of the latch $e'$ outward, so as to pass one on each side of the lug $d$, as is shown in Figs. 3 and 4, and in this case the latch forms a convenient lifting device by which the cover can be raised.

It will readily be seen that by this device the bail of a kettle or other vessel used for heating water or cooking may be kept comparatively cool by being held out of contact with the heated body of such kettle or vessel.

Having thus described my invention, I claim as new and desire to secure by Letters Patent—

1. A kettle or vessel lid provided with a catch arranged to yield to the pressure of the bail in rising and engage the bail and hold it in a vertical position, substantially as described.

2. An automatic bail-latch having the recess $e$ and wings $f\!f$, constructed to yield to the bail as it is raised and retain the same in the raised position, as described.

3. The combination, with the cover of a vessel, of a bail-latch provided with downward projections arranged to pass on each side of one of the lugs and guide the cover, as described.

LEONARD A. WHITE.

Witnesses:
J. A. MILLER, Jr.,
WM. L. COOP.